L. D. PAULSON.
BEAN THRESHER.
APPLICATION FILED JULY 22, 1918.

1,309,910.

Patented July 15, 1919.
2 SHEETS—SHEET 1.

Witnesses
W. C. Fielding.
H. B. Vrooman

Inventor
Lester D. Paulson
By Richard B. Owen.
Attorney

THE COLUMBIA PLANOGRAPH CO., WASHINGTON, D. C.

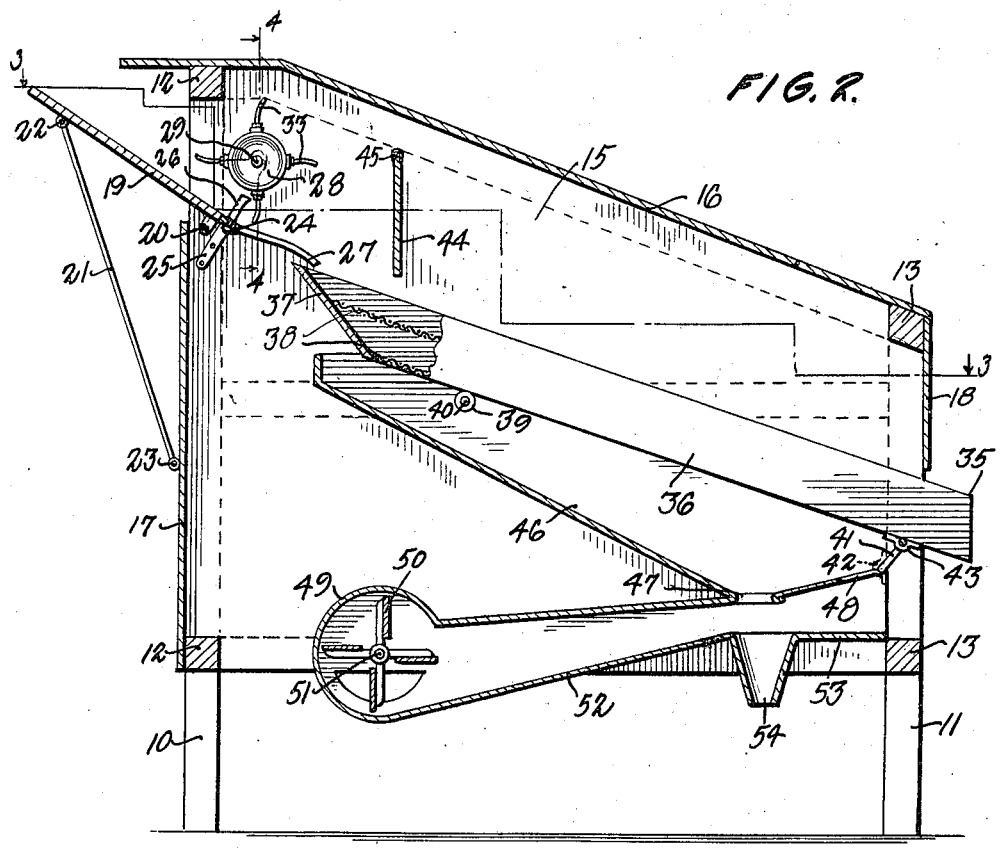

UNITED STATES PATENT OFFICE.

LESTER DONALD PAULSON, OF CLEAR LAKE, IOWA.

BEAN-THRESHER.

1,309,910.　　　　　Specification of Letters Patent.　　Patented July 15, 1919.

Application filed July 22, 1918.　Serial No. 246,248.

*To all whom it may concern:*

Be it known that I, LESTER D. PAULSON, a citizen of the United States, residing at Clear Lake, in the county of Cerro Gordo and State of Iowa, have invented certain new and useful Improvements in Bean-Threshers, of which the following is a specification.

This invention is a bean thresher and has for its principal object the production of a simplified construction which will readily remove the beans from the pod and thoroughly clean the same before dispensing the beans in a chute into a receiving receptacle.

Another object of this invention is the production of a comparatively simple and small bean thresher which will allow the same to be easily employed for private use and yet embodying a construction which will efficiently thresh the beans.

Another object of this invention is the production of a bean thresher wherein the beans are deposited upon a slanting platform, thus causing the beans to move downwardly into engagement with a plurality of teeth to be engaged by a rotary beater, thus causing the beans to be removed from the pods when the pods are opened, all of which will be deposited upon a sieve, whereby the beans may be separated from their pods and directed through the remaining cleaning elements of the harvester.

Another object of this invention is the production of a bean harvester wherein the sieve is movably mounted so as to thoroughly agitate the beans and cause the same to fall therethrough into a receiving hopper, free of vines, bean pods or other refuse and then to pass from the hopper through a wind conduit, thus causing dust to be removed from the beans.

A still further object of this invention is the production of a bean harvester wherein the wind conduit leads from a fan casing, this conduit being interposed between the lower end of the hopper and the upper end of the chute so that beans falling from the hopper into a chute to pass into a receiving receptacle will pass this conduit and the wind passing through the conduit will remove the dust therefrom.

One practical form of construction and assembly of the present invention will be hereinafter described and is illustrated in the accompanying drawings, in which—

Fig. 2 is a longitudinal vertical section through the device.

Fig. 3 is a horizontal section therethrough taken on the line 3—3 of Fig. 2.

Figure 1:
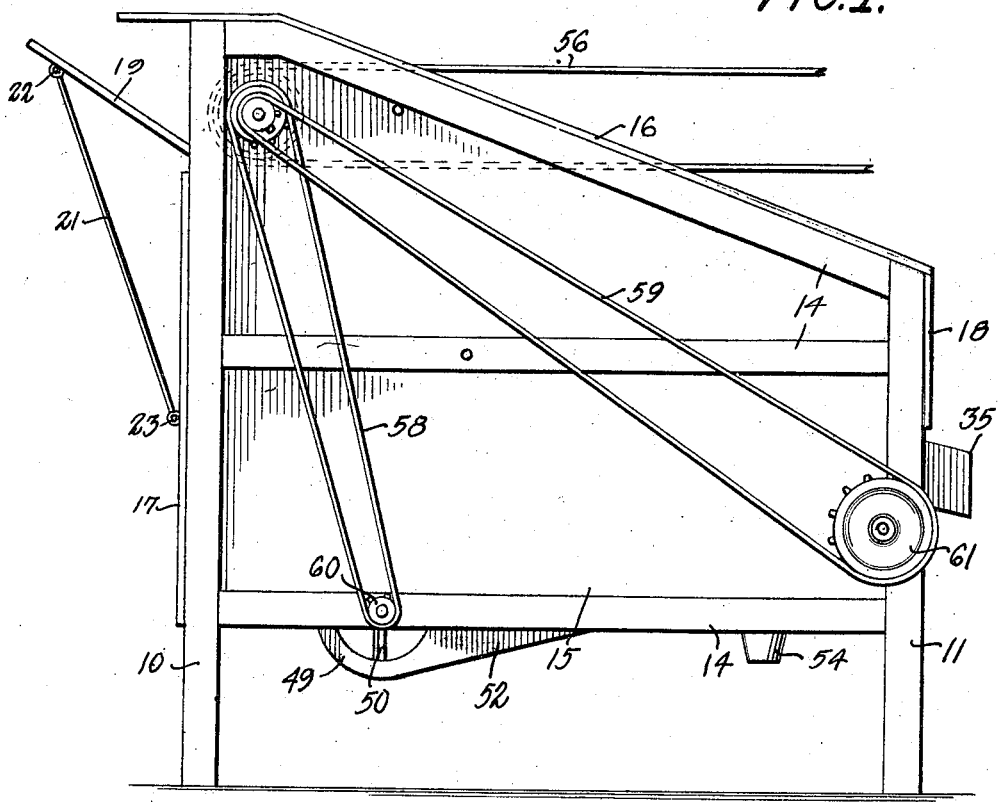
Figure 1 is a side elevation of the bean harvester.

In the preferred embodiment of the present invention, about to be described, it will be seen that 10 indicates the corner standards at the rear end of the machine, while 11 indicates the corner standards at the front end thereof. These standards are connected together by transverse beams 12 at their upper ends and adjacent their lower ends, while the standards 11 are connected together by beams 13 extending transversely, as shown in Fig. 2.

It will be noted upon referring to Fig. 3 that the standards at one end of the machine are connected together with the standards at the opposite ends thereof and the longitudinally extending beams 14, thus forming a reinforcing frame. Side walls 15 are connected to the longitudinal beams 14 and may be constructed of sheet metal or any other desired material, while a cover 16 is also positioned upon the top of the frame. A wall 17 is carried by the corner standards 10 at the rear end, it being noted that this wall terminates short of the beam 12 at the top of the corner standards 10. A wall 18 is carried upon the standards 11 and extends to a point adjacent the top of the cover 16, as shown in Figs. 1 and 2, it being noted that this wall 18 terminates at a considerable distance above the lower beams 13 of the standards 11, thus forming an opening through the forward end of the machine.

A slanting shelf 19 is secured as indicated at 20 upon the corner standards 10 at a point above the wall 17. This shelf 19 is held in a slanting position by the brace 21, which is secured at one end, as indicated at 22 to the shelf, while the opposite end of this brace, is secured as indicated at 23 upon the rear wall 17. Therefore, it will be obvious that the shelf is carried in a position to direct the beans into the interior of the machine when the same have been placed upon this shelf.

The strip 24 is fixed as indicated at 25 upon the side walls 15 and standards 10, it being noted that this strip 24 extends contiguous the inner edge of the shelf 19. This strip 24 is provided with upstanding teeth 26, extending in parallel spaced relation, while the downwardly slanting tines 27 also extend from the strip 24, as shown in Fig. 2.

Figure 4:
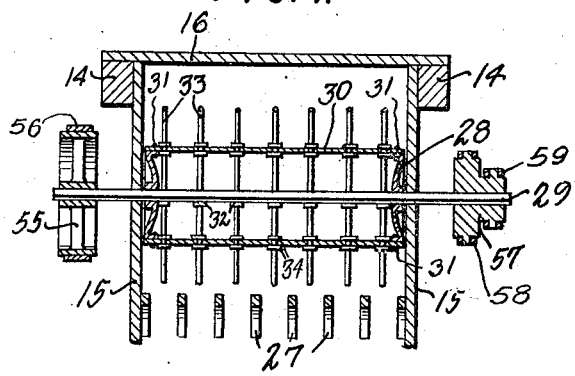
Fig. 4 is a vertical section taken on the line 4—4 of Fig. 2.
Figure 5:
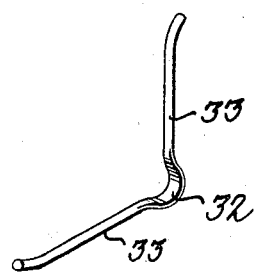
Fig. 5 is a detail perspective view of one of the elements which forms two of the tines of the rotary beater.

The rotary beater consists of end disks 28 carried in spaced relation upon the drive shaft 29, this drive shaft being carried by the side walls 15, as shown in Fig. 4. The cylinder sheet 30 is fixed as indicated at 31 upon the disks 28, at the peripheries thereof, thus causing the cylinder to rotate these disks, which are keyed or otherwise fixed upon the shaft 29. The several tines of the rotary beater are similarly constructed and for this reason attention is invited to Fig. 5 wherein the construction of a tine is disclosed. This element consists of a central flat bearing 32 having tine members 33 extending therefrom, at substantially right angles to each other. Therefore, the central flat bearing 32 of each tine will engage the shaft 29, while the tine members 33 extend through the cylinder sheet 30 as shown in Fig. 4, it being obvious that if desired, retaining elements 34 may be employed for further reinforcing these tine members.

As a number of these tine members are carried by the cylinder sheet, it is obvious that a rotary beater is provided which is carried adjacent the teeth 26 of the strip 24. Therefore, as the rotary beater is operated, it is obvious the tine members 33 thereof will move between the teeth 26 for assisting in the threshing of the beans.

A sieve is indicated in general at 35 and comprises side members 36 and end members 37 connected to make a hollow frame structure. The screens 38 may be carried within the hollow frame member extending longitudinally thereof, and being in parallel position to receive the beans thereon. It is of course obvious that any suitable construction of sieve member may be employed and in the present instance, the mesh should be large enough to permit the beans to fall therethrough, although if so desired, the mesh may be separated at a suitable interval to allow the beans to fall therethrough.

An idler 39 is carried by the shaft 40 supported upon a plurality of the longitudinally extending beams 14, whereby the upper end of the sieve 35 will be movably supported. The crank shaft 41 is carried by brackets 42 upon the corner standards 11 at the front end of the machine. This crank shaft 41 is also connected by brackets 43 to the sieve 35 adjacent the lower end thereof and for this reason it is obvious that as the crank shaft 41 is rotated, it will reciprocate the sieve. A partition guard 44 is hingedly mounted, as indicated at 45 within the main casing of the construction hereinbefore described at a point in front of the rotary beater and above the sieve. Therefore, this partition guard 44 is free to swing to permit the beans to pass the same down onto the sieve, although the partition guard will prevent the beans from being unduly thrown about within the interior of the casing.

The hopper 46 is fixed within the casing at a point below the sieve 35. It will be noted that this hopper 46 is substantially concaved, although it is of sufficient size to permit of the sieve to move around within the upper portions thereof, when the harvester is in use. However, this hopper 46 is provided with a dispensing opening 47 at its lower portion and is also provided with a slot 48 for permitting of rotary movement of the crank shaft 41.

A fan housing 49 is carried by the main casing and has a rotary fan 50 mounted therein and carried by the shaft 51. The conduit 52 leads from the fan housing 49 and is formed as a unit with the lower portions of the hopper 46 to communicate with the lower portions of the hopper at the dispensing opening 47 formed therethrough. It is of course obvious that any draft regulating means may be provided for the conduit 52. This air conduit 52 extends beyond the opening 47, as indicated at 53, although it will be noted that the inverted frusto-conical chute 54 is formed upon the air conduit 52, directly beneath the opening 47, as illustrated clearly in Fig. 2.

A pulley 55 is keyed upon the drive shaft 29 and may be driven by a belt 56 by any suitable form of motive power. Upon the opposite end of the drive shaft 29 is carried a double sprocket 57, from which leads the chains 58 and 59. The chain 58 leads around the sprocket 60, keyed to the fan shaft 51 while the chain 59 passes around the sprocket 61, keyed to the crank shaft 41. When this device is in operation, it is obvious that motive power may be applied to the machine as hereinbefore explained to drive the shaft 29. As the shaft is rotated, rotary motion will be imparted to the rotary beater, as it is obvious from an inspection of Fig. 4. At the time, the chain 58 will drive the fan 50 thus causing a draft through the conduit 52 and beyond the opening 47, through the extension 53 of the conduit 52, where the air is expelled into the outer atmosphere. The chain 59 will also drive the sprocket 61 and consequently will cause the crank shaft 41 to rotate, thus causing the sieve 35 to be rapidly reciprocated as hereinbefore explained.

It will be noted however, that the ratio of the gears will cause the fan to be rapidly driven, although the sieve 35 will be driven at a moderate speed.

At this time, the beans in their ordinary condition for harvesting or threshing may be placed upon the shelf 19. Owing to the slant of this shelf, the beans will slide therealong down into engagement with the teeth 26. The rotation of the beater at this point, will cause the tine members 33 thereof to grasp the beans together with any portion of vine or leaves therewith or other refuse and sufficiently tear the same apart, as well as rend the pods within which the beans may be carried.

The beans will then be thrown in the direction of the guide partition 44 and this partition will direct the beans down onto the rapidly moving sieve 35. As hereinbefore explained, the beans will here be freed from pods and all other refuse and will pass through the sieve down into the hopper. Owing to the concaved construction of the hopper, the beans will slide downwardly to the lower point thereof and will then fall through the opening 47 into the chute 54. When passing from the opening 47 to the chute 54 however, it is necessary for the beans to pass through the conduit 52 where the draft will free the same of dust which may be thereon. The receptacle positioned below the chute 54 will then receive the beans.

From the foregoing description it will be obvious that a comparatively simplified form of a bean threshing machine has been disclosed which will permit of individual use and will also allow the various mechanisms thereof to be driven by a comparatively small motive power. It is also obvious that the beans may be placed upon the shelf and that further operations are automatic and that the beans will finally be dispensed from the machine in a fresh and comparatively clean condition. Also, the refuse which is caught by the sieve 35 may be finally taken from the forward end thereof as the same is reciprocated.

The foregoing description and the drawings have reference to what may be considered, the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is—

1. In a device of the class described, the combination of a supporting frame, a shaft carried by said supporting frame, means for rotating said shaft, a rotary beater mounted upon said shaft and consisting of end disks keyed upon said shaft, a cylindrical sheet of material fixed upon the peripheries of said disks, tines consisting of central flat bearings having tine members extending from each bearing, the tine members of each bearing extending at right angles to each other and projecting through said sheet, thus causing said flat bearings to engage said shaft, and retaining means carried upon the tine members and embracing the inner and outer surfaces of said sheet for holding the tines in set position.

2. In a device of the class described, the combination of a supporting frame, a rotatable shaft carried by said frame, a rotary beater frame keyed upon said shaft, tines consisting of flat central bearings having tine members extending therefrom, the tine members of each tine projecting at right angles to each other, said bearings engaging said shaft while said tine members extend to engage said beater frame, and means for fixing said tine members upon the beater frame.

3. In a device of the class described, the combination of a supporting frame, a rotatable shaft carried by said frame, a rotary beater frame keyed upon said shaft, one piece tines consisting of tine members extending at substantially right angles to each other, said tines engaging said shaft and said tine members extending to engage said beater frame, and means for fixing said tine members upon said beater frame.

4. In a device of the class described, the combination of a supporting frame, a shaft carried by said supporting frame, means for rotating said shaft, a rotary beater mounted upon said shaft and consisting of end disks, keyed upon said shaft, a cylindrical sheet of material fixed upon the peripheries of said disks, one piece tines including tine members extending at right angles to each other, said tines fitting about said shaft and said tine members extending through said sheet of material and retaining means carried by said tine member and embracing the inner and outer surfaces of said piece for holding the tines in set position.

In testimony whereof I affix my signature in presence of two witnesses.

LESTER DONALD PAULSON.

Witnesses:
A. R. CAIN,
W. L. JENSEN.

Copies of this patent may be obtained for five cents each, by addressing the "Commissioner of Patents. Washington, D. C."